US 11,003,038 B2

(12) United States Patent
Kim

(10) Patent No.: US 11,003,038 B2
(45) Date of Patent: May 11, 2021

(54) DISPLAY APPARATUS

(71) Applicant: Samsung Display Co., Ltd., Yongin-si (KR)

(72) Inventor: Yeoncu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/058,553

(22) Filed: Aug. 8, 2018

(65) Prior Publication Data

US 2019/0056609 A1 Feb. 21, 2019

(30) Foreign Application Priority Data

Aug. 21, 2017 (KR) .......................... 10-2017-0105680

(51) Int. Cl.
*G02F 1/1368* (2006.01)
*G02F 1/1343* (2006.01)
*G02F 1/1362* (2006.01)
*G02F 1/1337* (2006.01)

(52) U.S. Cl.
CPC ...... *G02F 1/1368* (2013.01); *G02F 1/134336* (2013.01); *G02F 1/136286* (2013.01); *G02F 1/133707* (2013.01); *G02F 1/134345* (2021.01); *G02F 1/136222* (2021.01); *G02F 1/136227* (2013.01); *G02F 2201/123* (2013.01); *G02F 2201/40* (2013.01); *G02F 2201/52* (2013.01)

(58) Field of Classification Search
CPC ............. G02F 1/1368; G02F 1/134336; G02F 1/136286
See application file for complete search history.

(56) References Cited

U.S. PATENT DOCUMENTS

| 8,891,044 B2 | 11/2014 | Hirota et al. | |
| 2015/0146126 A1* | 5/2015 | Shin .................. | G02F 1/134309 349/43 |
| 2016/0041437 A1* | 2/2016 | Lin .................... | G02B 27/0101 349/61 |
| 2016/0041660 A1 | 2/2016 | Kang et al. | |
| 2016/0260401 A1 | 9/2016 | Sakaigawa | |
| 2017/0023833 A1* | 1/2017 | No .................... | G02F 1/134309 |
| 2017/0075166 A1* | 3/2017 | Son .................... | G02F 1/133512 |

FOREIGN PATENT DOCUMENTS

| KR | 10-0908964 | 7/2009 |
| KR | 10-2011-0045484 | 5/2011 |
| KR | 10-2016-0018213 | 2/2016 |
| KR | 10-1787238 | 10/2017 |

* cited by examiner

*Primary Examiner* — Walter H Swanson
(74) *Attorney, Agent, or Firm* — Lewis Roca Rothgerber Christie LLP

(57) ABSTRACT

A display apparatus includes a plurality of gate lines extending in a first direction, a plurality of data lines extending in a second direction crossing the first direction, and a plurality of pixels connected to the gate lines and the data lines. Each of the pixels includes a first sub-pixel, a second sub-pixel, and a third sub-pixel disposed in an i-th row and a fourth sub-pixel disposed in an (i+1)-th row. The first, second, and third sub-pixels and the fourth sub-pixel are disposed with the i-th gate line between the fourth sub-pixel and the first, second, and third sub-pixels and connected to the i-th gate line, and the first, second, third, and fourth sub-pixels are connected to different data lines from each other.

14 Claims, 10 Drawing Sheets

DISPLAY APPARATUS

CROSS-REFERENCE TO RELATED APPLICATION

This application claims priority to and the benefit of Korean Patent Application No. 10-2017-0105680, filed on Aug. 21, 2017, the contents of which are hereby incorporated by reference in its entirety.

BACKGROUND

1. Field

The present disclosure relates to a display apparatus, and more particularly, to a display apparatus capable of improving brightness.

2. Description of the Related Art

In general, a display apparatus displays various colors using three primary colors of red, green, and blue colors. Accordingly, a display panel of the display apparatus includes pixels respectively corresponding to the red, green, and blue colors.

In recent years, a display apparatus that displays the colors using other primary colors in addition to the red, green, and blue colors has been developed. As the other primary colors, one or more colors of magenta, cyan, yellow, and white colors are used. To improve brightness of a display image, a display apparatus that includes red, green, blue, and white pixels has been developed.

SUMMARY

Aspects of embodiments of the present disclosure are directed toward a display apparatus capable of improving brightness.

Embodiments of the inventive concept provide a display apparatus including a plurality of gate lines extending in a first direction, a plurality of data lines extending in a second direction crossing the first direction, and a plurality of pixels connected to the gate lines and the data lines. Each of the pixels includes first, second, and third sub-pixels disposed in an i-th row and a fourth sub-pixel disposed in an (i+1)-th row. The first, second, and third sub-pixels and the fourth sub-pixel are disposed (e.g., arranged) with an i-th row (e.g., an i-th gate line) between the fourth sub-pixel and the first, second, and third sub-pixels and connected to the i-th gate line, and the first, second, third, and fourth sub-pixels are connected to different data lines.

Embodiments of the inventive concept provide a display apparatus including a plurality of gate lines extending in a first direction, a plurality of data lines extending in a second direction crossing the first direction, and a plurality of pixels connected to the gate lines and the data lines. Each of the pixels includes a plurality of first and second pixels each including three sub-pixels of the first, second, third, and fourth sub-pixels, and the first pixels are alternately arranged with the second pixels in the first and second directions. Each of the first pixels includes the first sub-pixel, the second sub-pixel, and the fourth sub-pixel of the first, second, third, and fourth sub-pixels. Each of the second pixels includes the third sub-pixel, the second sub-pixel, and the fourth sub-pixel of the first, second, third, and fourth sub-pixels. The second sub-pixels of the first and second pixels arranged in a same column are disposed in an h-th column. The first, third, and fourth sub-pixels of the first and second pixels arranged in the same column are disposed in an (h+1)-th column.

According to the above, the display apparatus improves the brightness by increasing an aperture ratio and the light transmittance.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
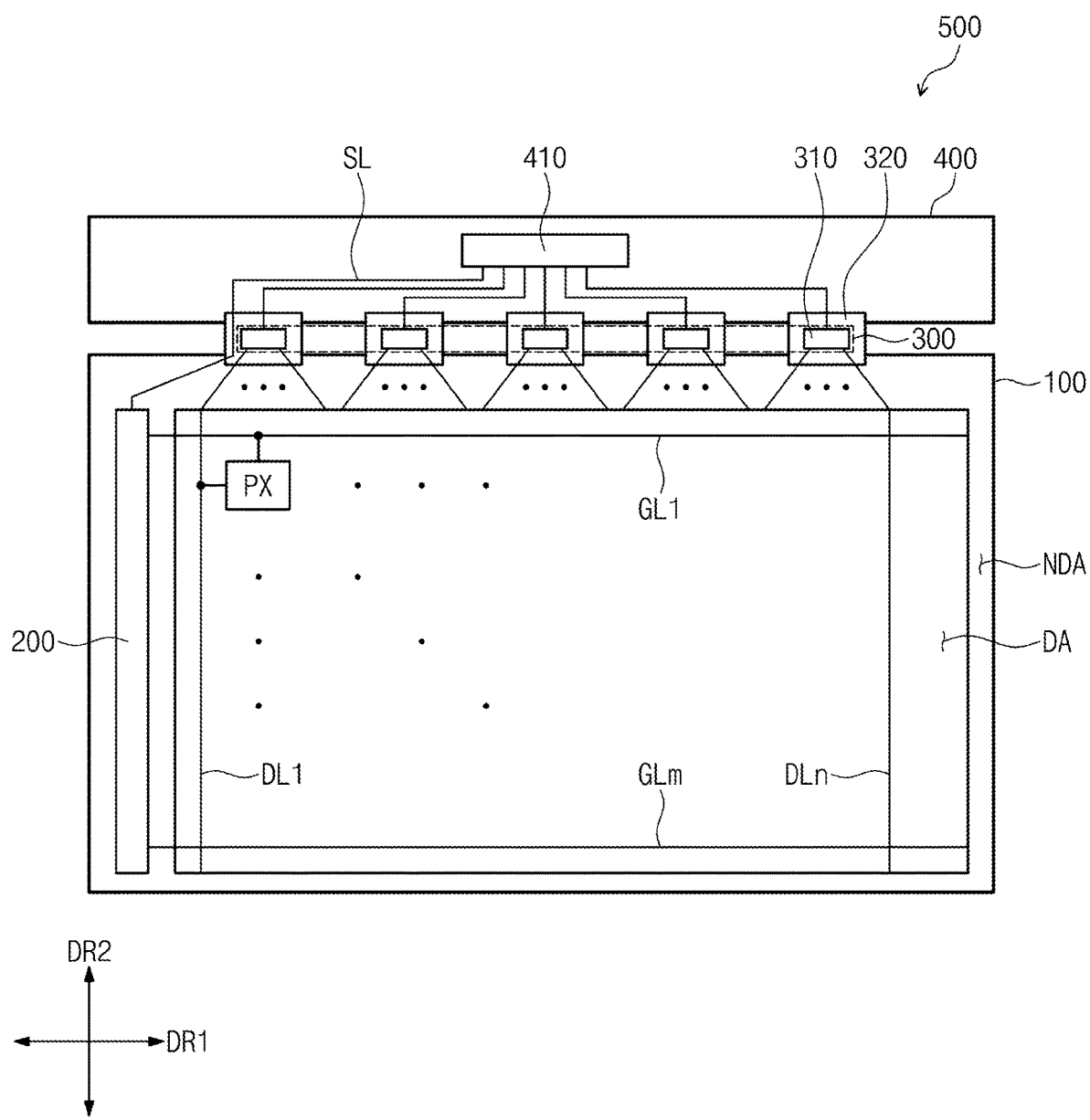
FIG. 1 is a plan view showing a display apparatus according to an exemplary embodiment of the present disclosure.

Hereinafter, exemplary embodiments of the present invention will be explained in detail with reference to the accompanying drawings. The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. Further, the use of "may" when describing embodiments of the inventive concept refers to "one or more embodiments of the inventive concept."

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be understood that, although the terms first, second, etc. may be used herein to describe various elements, components, and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present invention.

Embodiments described in the disclosure are described with reference to plan views and cross-sectional views that are ideal schematic diagrams. Accordingly, shapes of the exemplary views may vary depending on manufacturing technologies and/or tolerances. Thus, embodiments are not limited to shown specific forms and also include variations in form produced according to manufacturing processes. Therefore, regions illustrated in the drawings are exemplary, and the shapes of the regions illustrated in the drawings are intended to illustrate the specific shapes of the regions of elements and not to limit the scope of the present disclosure.

Hereinafter, the present invention will be explained in detail with reference to the accompanying drawings.

FIG. 1 is a plan view showing a display apparatus 500 according to an exemplary embodiment of the present disclosure.

Referring to FIG. 1, the display apparatus 500 of the present disclosure includes a display panel 100, a gate driver 200, a data driver 300, a printed circuit board 400, and a timing controller 410. The display panel 100 may have a rectangular shape with long sides in a first direction DR1 and short sides in a second direction DR2 crossing the first direction DR1.

The display panel 100 may be a liquid crystal display panel including a first substrate, a second substrate facing the first substrate, and a liquid crystal layer disposed between the first substrate and the second substrate, but it should not be limited thereto or thereby. That is, various panels, such as an electrophoretic display panel including an electrophoretic layer, an electrowetting display panel including an electrowetting layer, an organic light emitting display panel including an organic light emitting layer, etc., may be used as the display panel 100.

The display panel 100 includes a plurality of gate lines GL1 to GLm, a plurality of data lines DL1 to DLn, and a plurality of pixels PX. Each of "m" and "n" is a natural number. For the purpose of ease and convenience in explanation, FIG. 1 illustrates one pixel PX as a representative example, but not being limited thereto. That is, a plurality of pixels PX may be disposed in the display panel 100. The display panel 100 includes a display area DA displaying an image and a non-display area NDA disposed to surround the display area DA when viewed in a plan view. The non-display area NDA does not display the image.

The gate lines GL1 to GLm and the data lines DL1 to DLn are insulated from each other while crossing each other. The gate lines GL1 to GLm extend in the first direction DR1 and are connected to the gate driver 200. The data lines DL1 to DLn extend in the second direction DR2 and are connected to the data driver 300.

The pixels PX are arranged in areas or regions defined by the gate lines GL1 to GLm and the data lines DL1 to DLn crossing each other. The pixels PX are arranged in a matrix form and disposed in the display area DA. The pixels PX are connected to the gate lines GL1 to GLm and the data lines DL1 to DLn. Each of the pixels may display one of red, green, blue, and white colors.

The gate driver 200 may be disposed in the non-display area NDA of the display panel 100, which is adjacent to one short side of the short sides of the display panel 100. The gate driver 200 may be formed through the same process as transistors of the pixels PX and mounted on the display panel 100 in an amorphous silicon TFT gate driver circuit (ASG) form or an oxide silicon TFT gate driver circuit (OSG) form, but it should not be limited thereto or thereby. That is, the gate driver 200 may include a plurality of gate driving chips, and the gate driving chips may be connected to the display panel 100 through flexible printed circuit boards or mounted on the display panel 100 in a chip-on-glass (COG) manner.

The data driver 300 includes a plurality of source driving chips 310, and the source driving chips 310 are mounted on flexible printed circuit boards 320. The source driving chips 310 are connected to the printed circuit board 400 and the non-display area NDA of the display panel 100, which is adjacent to one long side of the long sides of the display panel 100 through the flexible printed circuit boards 320, but it should not be limited thereto or thereby. That is, the source driving chips 310 may be mounted on the display panel 100 in a chip-on-glass (COG) manner.

The timing controller 410 is mounted on the printed circuit board 400 in an integrated circuit chip and connected to the gate driver 200 and the data driver 300 through signal lines SL. The timing controller provides a plurality of image data to display an image to the data driver 300. The timing controller 410 provides a gate control signal to control an operation of the gate driver 200 to the gate driver 200 and a data control signal to control an operation of the data driver 300 to the data driver 300.

The gate driver 200 generates a plurality of gate signals in response to the gate control signal received from the timing controller 410. The gate signals are sequentially output and provided to the pixels PX through the gate lines GL1 to GLm in the unit of row (e.g., along a row direction). As a result, the pixels PX may be driven in the unit of row (e.g., driven one row at a time).

The data driver 300 generates data voltages in an analog form corresponding to the image data in response to the data control signal received from the timing controller 410. The data voltages are provided to the pixels PX through the data lines DL1 to DLn.

The pixels PX receive the data voltages in response to the gate signals. The pixels PX driven by the data voltages display the image.

Figure 2:
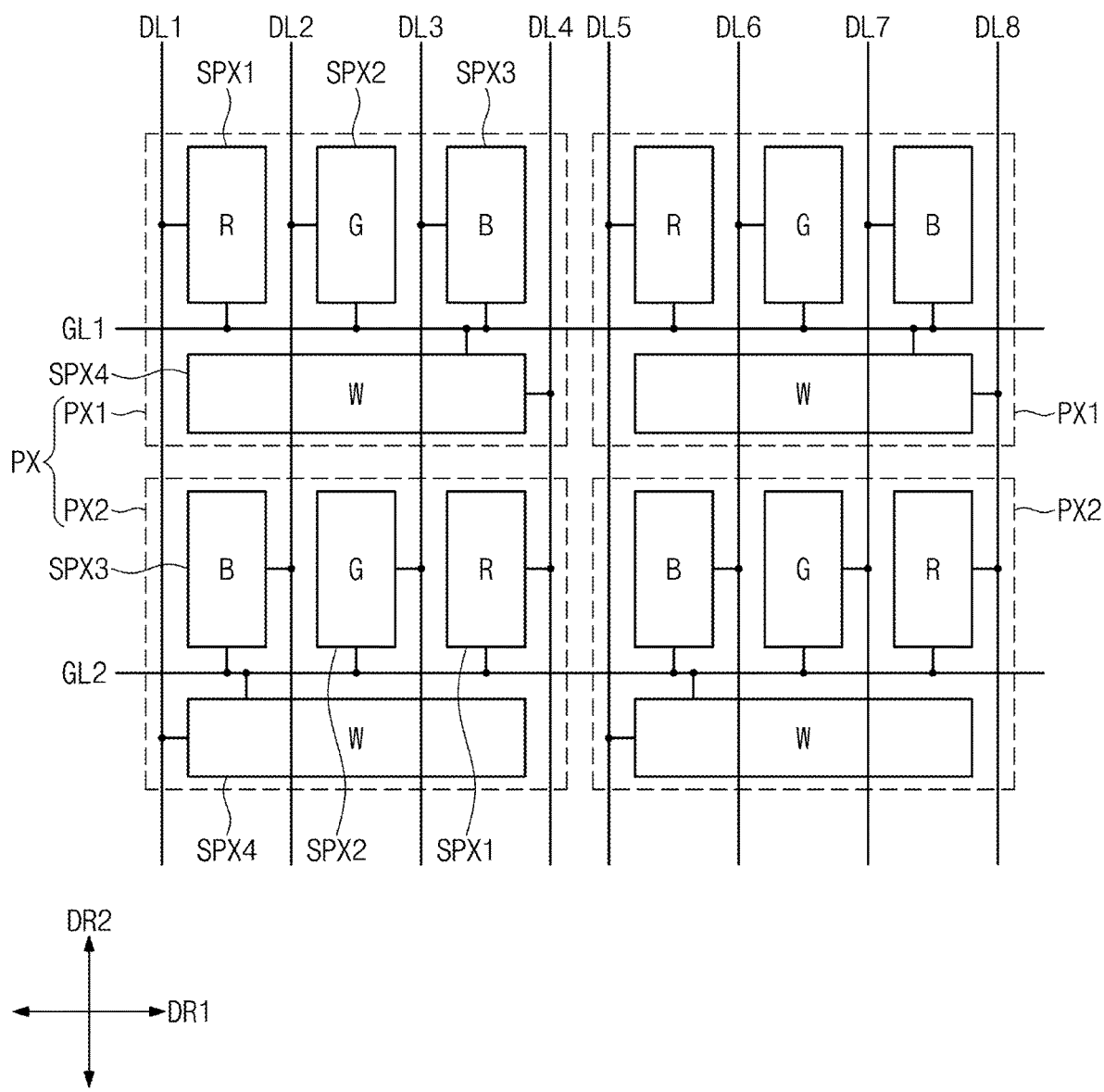
FIG. 2 is a view showing a configuration of pixels illustrated in FIG. 1.

FIG. 2 is a view showing a configuration of the pixels illustrated in FIG. 1.

Referring to FIG. 2, each of the pixels PX includes a first sub-pixel SPX1, a second sub-pixel SPX2, a third sub-pixel SPX3, and a fourth sub-pixel SPX4. The first, second, and third sub-pixels SPX1, SPX2, and SPX3 are arranged with each other in the first direction DR1, and the fourth sub-pixel SPX4 is disposed under and arranged with the first, second, and third sub-pixels SPX1, SPX2, and SPX3 in the second direction DR2.

For example, the first, second, and third sub-pixels SPX1, SPX2, and SPX3 of each of the pixels PX may be disposed in an i-th row, and the fourth sub-pixel SPX4 of each of the pixels PX may be disposed in an (i+1)-th row. Each of the first, second, and third sub-pixels SPX1, SPX2, and SPX3 may have a length (e.g., a major axis or long side) that extend in the second direction DR2, and the fourth sub-pixel SPX4 may have a length (e.g., a major axis or long side) that extend in the first direction DR1. Each of the fourth sub-pixels SPX4 is larger (e.g., larger in area) than each of the first, second, and third sub-pixels SPX1, SPX2, and SPX3.

The pixels PX include a plurality of first pixels PX1 arranged with each other in the first direction DR1 and a plurality of second pixels PX2 arranged with each other in the first direction DR1. In one embodiment, the first pixels PX1 and the second pixels PX2 are alternatively arranged with each other in the second direction DR2.

Each of the first and second pixels PX1 and PX2 include the first sub-pixel SPX1, the second sub-pixel SPX2, the third sub-pixel SPX3, and the fourth sub-pixel SPX4. As an exemplary embodiment, the first sub-pixel SPX1 may be a red pixel to display a red color, the second sub-pixel SPX2 may be a green pixel to display a green color, the third sub-pixel SPX3 may be a blue pixel to display a blue color, and the fourth sub-pixel SPX4 may be a white pixel to display a white color.

The first, second, and third sub-pixels SPX1, SPX2, and SPX3 and the fourth sub-pixel SPX4 are disposed with an i-th gate line between the fourth sub-pixel SPX4 and the first, second, and third sub-pixels SPX1, SPX2, and SPX3 and connected to the i-th gate line. For example, the first, second, and third sub-pixels SPX1, SPX2, and SPX3 and the fourth sub-pixel SPX4 of each of the first pixels PX1 are disposed with a first gate line GL1 therebetween and connected to the first gate line GL1. The first, second, and third sub-pixels SPX1, SPX2, and SPX3 and the fourth sub-pixel SPX4 of each of the second pixels PX2 are disposed with a second gate line GL2 therebetween and connected to the second gate line GL2.

The first, second, third, and fourth sub-pixels SPX1, SPX2, SPX3, and SPX4 are connected to different data lines from each other. For example, the first, second, third, and fourth sub-pixels SPX1, SPX2, SPX3, and SPX4 may be connected to a j-th data line, a (j+1)-th data line, a (j+2)-th data line, and a (j+3)-th data line, respectively. Each of the "i" and "j" is a natural number.

In detail, the first sub-pixel SPX1 of each of the first pixels PX1 is connected to the j-th data line, the second sub-pixel SPX2 of each of the first pixels PX1 is connected to the (j+1)-th data line, the third sub-pixel SPX3 of each of the first pixels PX1 is connected to the (j+2)-th data line, and the fourth sub-pixel SPX4 of each of the first pixels PX1 is connected to the (j+3)-th data line. For example, in the first pixel PX1 disposed at a relatively left side of the first pixels PX1 illustrated in FIG. 2, the first sub-pixel SPX1 is connected to the first data line DL1, the second sub-pixel SPX2 is connected to the second data line DL2, the third sub-pixel SPX3 is connected to the third data line DL3, and the fourth sub-pixel SPX4 is connected to the fourth data line DL4.

The first sub-pixel SPX1 of each of the second pixels PX2 is connected to the (j+3)-th data line, the second sub-pixel SPX2 of each of the second pixels PX2 is connected to the (j+2)-th data line, the third sub-pixel SPX3 of each of the second pixels PX2 is connected to the (j+1)-th data line, and the fourth sub-pixel SPX4 of each of the second pixels PX2 is connected to the j-th data line. For example, in the second pixel PX2 disposed at a relatively left side of the second pixels PX2 illustrated in FIG. 2, the first sub-pixel SPX1 is connected to the fourth data line DL4, the second sub-pixel SPX2 is connected to the third data line DL3, the third sub-pixel SPX3 is connected to the second data line DL2, and the fourth sub-pixel SPX4 is connected to the first data line DL1.

The fourth sub-pixels SPX4 are disposed between the j-th data line and the (j+3) data line, and the (j+1)-th data line and the (j+2)-th data line extend through the fourth sub-pixels SPX4. For example, the fourth sub-pixel SPX4 of the first pixel PX1 disposed at a relatively left side of the first pixels PX1 is disposed between the first data line DL1 and the fourth data line DL4, and the second and third data lines DL2 and DL3 extend through the fourth sub-pixel SPX4.

Figure 3:
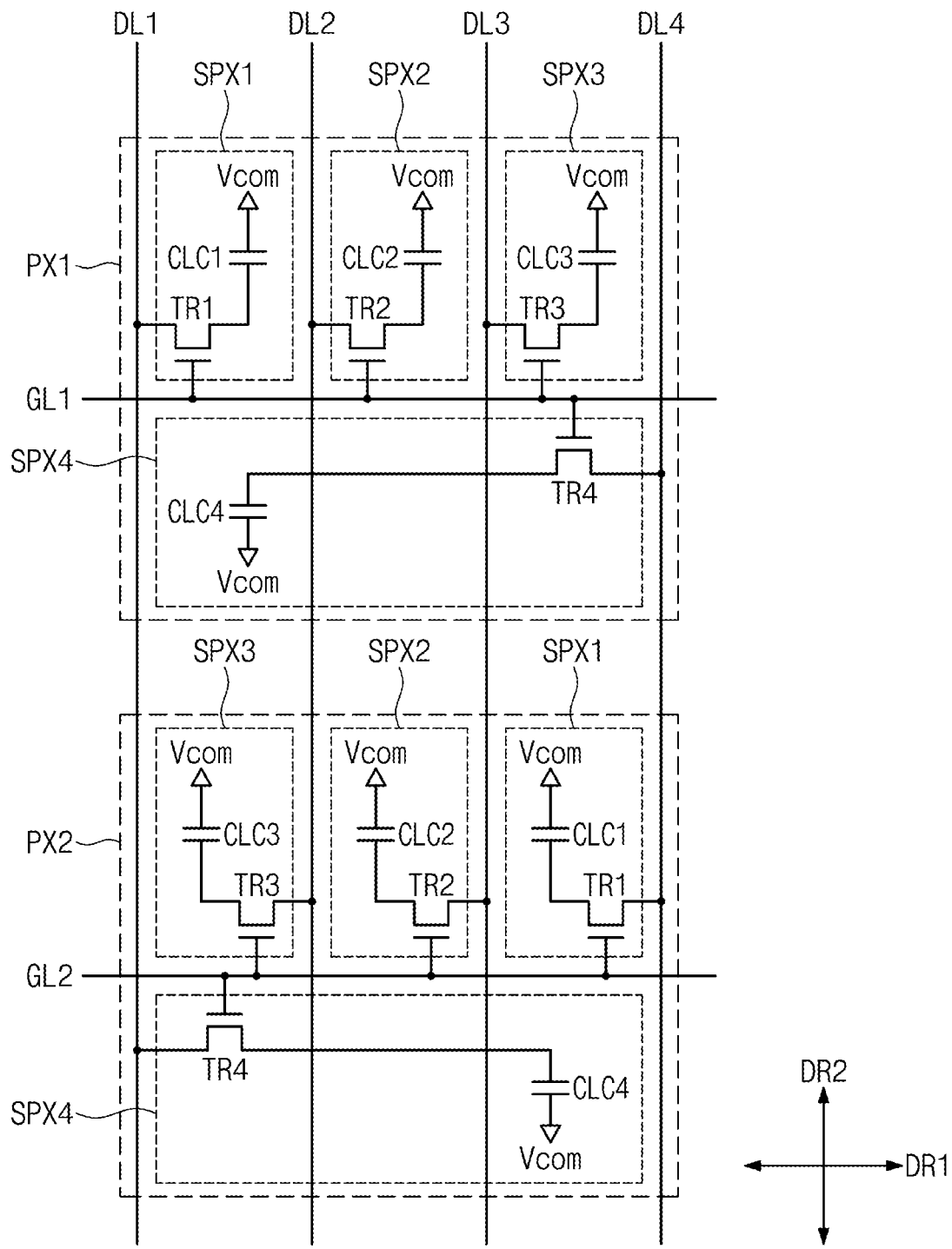
FIG. 3 is an equivalent circuit diagram showing a first pixel and a second pixel illustrated in FIG. 2.

FIG. 3 is an equivalent circuit diagram showing the first pixel PX1 and the second pixel PX1 illustrated in FIG. 2.

Referring to FIG. 3, the first sub-pixel SPX1 includes a first transistor TR1 and a first liquid crystal capacitor CLC1 connected to the first transistor TR1. The second sub-pixel SPX2 includes a second transistor TR2 and a second liquid crystal capacitor CLC2 connected to the second transistor TR2. The third sub-pixel SPX3 includes a third transistor TR3 and a third liquid crystal capacitor CLC3 connected to the third transistor TR3. The fourth sub-pixel SPX4 includes a fourth transistor TR4 and a fourth liquid crystal capacitor CLC4 connected to the fourth transistor TR4.

The first, second, third, and fourth transistors TR1, TR2, TR3, and TR4 of each of the first and second pixels PX1 and PX2 are connected to a corresponding i-th gate line of the gate lines GL1 to GLm and corresponding j-th, (j+1)-th, (j+2)-th, and (j+3)-th data lines of the data lines DL1 to DLn, respectively. For example, the first transistor TR1 of the first pixel PX1 is connected to the first gate line GL1 and the first data line DL1, the second transistor TR2 of the first pixel PX1 is connected to the first gate line GL1 and the second data line DL2, the third transistor TR3 of the first pixel PX1 is connected to the first gate line GL1 and the third data line DL3, and the fourth transistor TR4 of the first pixel PX1 is connected to the first gate line GL1 and the fourth data line DL4.

The first transistor TR1 of the second pixel PX2 is connected to the second gate line GL2 and the fourth data line DL4, the second transistor TR2 of the second pixel PX2 is connected to the second gate line GL2 and the third data line DL3, the third transistor TR3 of the second pixel PX2 is connected to the second gate line GL2 and the second data line DL2, and the fourth transistor TR4 of the second pixel PX2 is connected to the second gate line GL2 and the first data line DL1.

The first, second, third, and fourth transistors TR1, TR2, TR3, and TR4 are turned on in response to a gate signal applied thereto through the i-th gate line. The turned-on first, second, third, and fourth transistors TR1, TR2, TR3, and TR4 are provided with data voltages through the j-th, (j+1)-th, (j+2)-th, and (j+3)-th data lines and provide the data voltages to the first, second, third, and fourth liquid crystal capacitors CLC1, CLC2, CLC3, and CLC4.

The first, second, third, and fourth liquid crystal capacitors CLC1, CLC2, CLC3, and CLC4 are applied with a common voltage Vcom. Liquid crystal molecules of the first, second, third, and fourth liquid crystal capacitors CLC1, CLC2, CLC3, and CLC4 are driven by an electric field generated by difference in voltage level between the data voltages and the common voltage Vcom to control a transmittance of light. As a result, the image is displayed.

Figure 4:
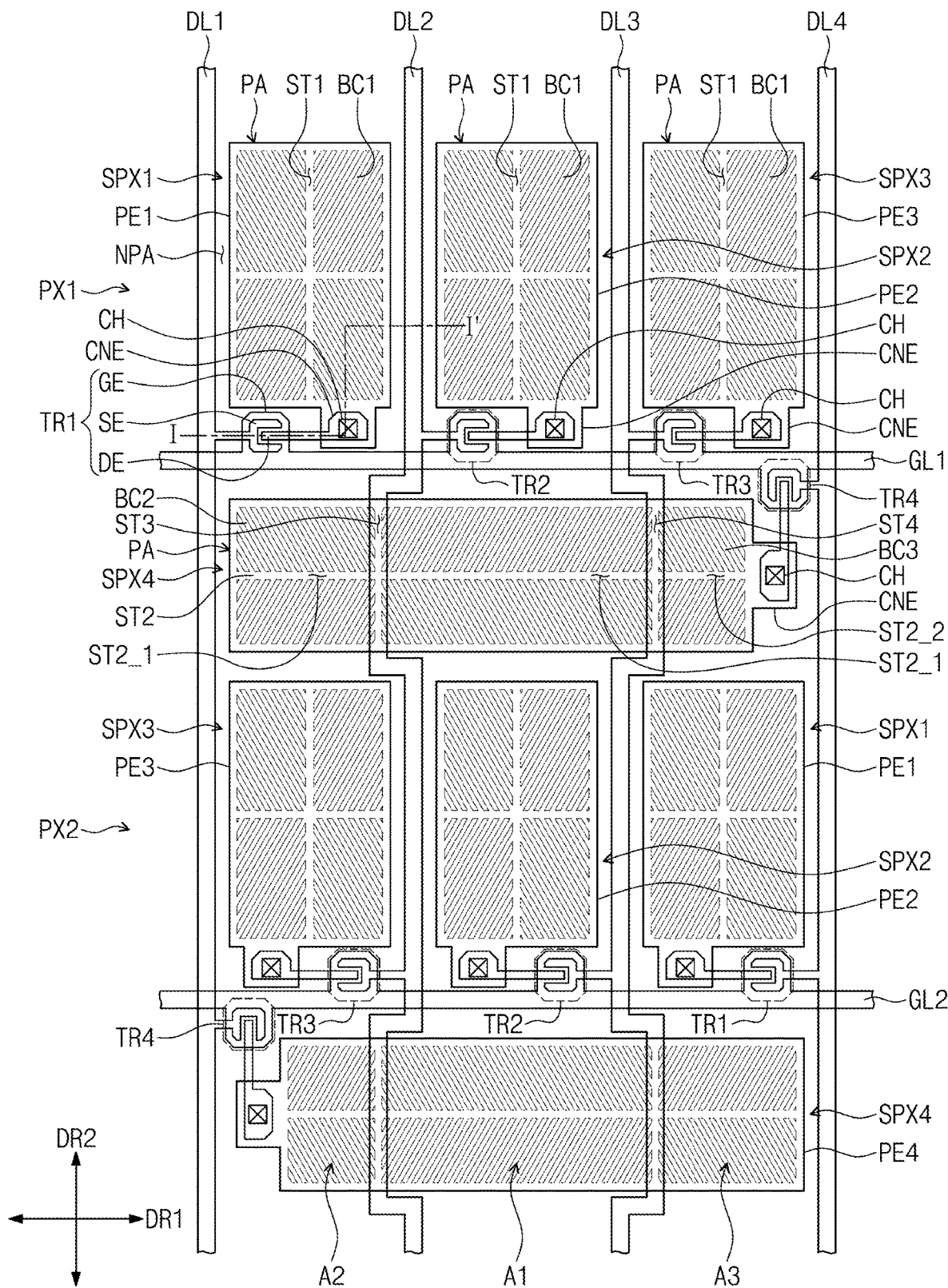
FIG. 4 is a layout diagram showing the first pixel and the second pixel illustrated in FIG. 3.
Figure 5:
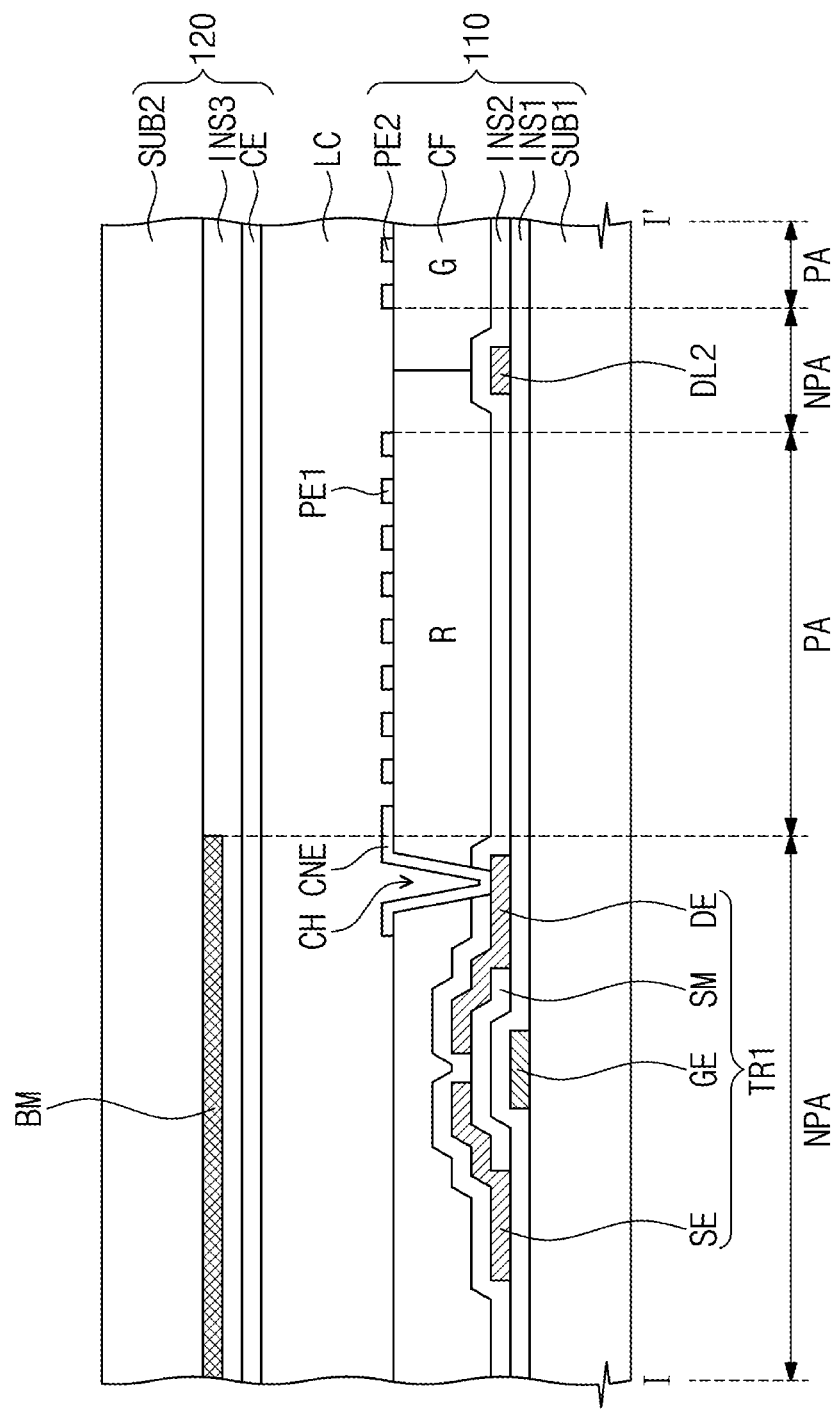
FIG. 5 is a cross-sectional view taken along a line I-I' illustrated in FIG. 4.

FIG. 4 is a layout diagram showing the first pixel PX1 and the second pixel PX2 illustrated in FIG. 3. FIG. 5 is a cross-sectional view taken along a line I-I' illustrated in FIG. 4.

Referring to FIG. 4, the first sub-pixel SPX1 includes the first transistor TR1 and a first pixel electrode PE1 connected to the first transistor TR1. The second sub-pixel SPX2 includes the second transistor TR2 and a second pixel electrode PE2 connected to the second transistor TR2. The third sub-pixel SPX3 includes the third transistor TR3 and a third pixel electrode PE3 connected to the third transistor TR3. The fourth sub-pixel SPX4 includes the fourth transistor TR4 and a fourth pixel electrode PE4 connected to the fourth transistor TR4. An area where each of the first, second, third, and fourth pixel electrodes is disposed is referred to as a pixel area PA, and an area surrounding the pixel area PA is referred to as a non-pixel area NPA.

Because cross-sectional structures of the first, second, third, and fourth sub-pixels SPX1, SPX2, SPX3, and SPX4 are substantially the same, hereinafter, the cross-sectional structure of the first sub-pixel SPX1 will be described as a representative example, and descriptions of the cross-sectional structures of other sub-pixels SPX2, SPX3, and SPX4 will be omitted. Also, the first, second, third, and fourth transistors TR1, TR2, TR3, and TR4 have substantially the same structure. Thus, hereinafter, the structure of the first transistor TR1 will be described in detail, and descriptions of other transistors TR2, TR3, and TR4 will be omitted.

Each of the first, second, third, and fourth transistors TR1, TR2, TR3, and TR4 includes a gate electrode GE branched from a corresponding gate line of the gate lines GL1 to GLm, a source electrode SE branched from a corresponding data line of the data lines DL1 to DLn, and a drain electrode DE connected to a connection electrode CNE branched from a corresponding pixel electrode of the first, second, third, and fourth pixel electrodes PE1, PE2, PE3, and PE4.

For example, the first transistor TR1 includes the gate electrode GE branched from the first gate line GL1, the source electrode SE branched from the first data line DL1, and the drain electrode DE connected to the connection electrode CNE branched from the first pixel electrode PE1. The drain electrode DE is electrically connected to the first pixel electrode PE1 through the connection electrode CNE.

Referring to FIG. 5, the first sub-pixel SPX1 may include a first substrate 110, a second substrate 120 facing the first substrate 110, and a liquid crystal layer LC disposed between the first substrate 110 and the second substrate 120. The first substrate 110 includes a first base substrate SUB1, the first transistor TR1, color filters CF, and the first pixel electrode PE1. The second substrate 120 includes a second base substrate SUB2, a black matrix BM, a third insulating layer INS3, and a common electrode CE.

The gate electrode GE of the first transistor TR1 is disposed on the first base substrate SUB1. The first base substrate SUB1 may be a transparent insulating substrate or a non-transparent insulating substrate. For instance, the first base substrate SUB1 may be a silicon substrate, a glass substrate, or a plastic substrate. A first insulating layer INS1 is disposed on the first base substrate SUB1 to cover the gate electrode GE. The first insulating layer INS1 is referred to as a gate insulating layer. The first insulating layer INS1 may be an inorganic insulating layer including an inorganic material.

A semiconductor layer SM of the first transistor TR1 is disposed on the first insulating layer INS1 which covers the gate electrode GE. Although not shown in figures, the semiconductor layer SM may include an active layer and an ohmic contact layer. The source electrode SE and the drain electrode DE of the first transistor TR1 are disposed on the semiconductor layer SM and the first insulating layer INS1, and the source electrode SE and the drain electrode DE are spaced apart from each other. The semiconductor layer SM forms a conductive channel between the source electrode SE and the drain electrode DE.

A second insulating layer INS2 is disposed on the first insulating layer INS1 to cover the first transistor TR1 and the data line DL2. The second insulating layer INS2 is referred to as a passivation layer. The second insulating layer INS2 may be an inorganic insulating layer including an inorganic material. The second insulating layer INS2 covers an exposed upper portion of the semiconductor layer SM.

The color filters CF are disposed on the second insulating layer INS2. The first sub-pixel SPX1 may include a red color filter to display the red color R. The second sub-pixel SPX2 may include a green color filter to display the green color G. Although not shown in figures, the third sub-pixel SPX3 may include a blue color filter to display the blue color. The fourth sub-pixel SPX4 may include a white color filter to display the white color. The white color is substantially an achromatic color, and the white color filter may include a transparent organic insulating layer to transmit a light. The color filters CF provide respective colors to the light passing through the first, second, third, and fourth sub-pixels SPX1, SPX2, SPX3, and SPX4.

A contact hole CH is defined penetrating through the second insulating layer INS2 and the red color filter CF to expose a set or predetermined area of the drain electrode DE. The first pixel electrode PE1 is disposed on the red color filter CF in the pixel area PA. The connection electrode CNE branched from the first pixel electrode PE1 is electrically connected to the drain electrode DE through the contact hole CH.

The black matrix BM is disposed under the second base substrate SUB2. The black matrix BM is disposed in the non-pixel area NPA. The second base substrate SUB2 may be a transparent insulating substrate or a non-transparent insulating substrate. The black matrix BM may prevent a light leakage from occurring in boundaries of the first, second, third, and fourth sub-pixels SPX1, SPX2, SPX3, and SPX4.

The third insulating layer INS3 is disposed under the second base substrate SUB2 to cover the black matrix BM (e.g., to encapsulate the black matrix BM with the second base substrate SUB2). The third insulating layer INS3 may be an organic insulating layer. The common electrode CE is disposed under the third insulating layer INS3.

The first pixel electrode PE1 and the common electrode CE may include a transparent conductive material. For instance, the first pixel electrode PE1 and the common electrode CE may include a transparent conductive material, such as indium tin oxide (ITO), indium zinc oxide (IZO), indium tin zinc oxide (ITZO), etc.

In one embodiment, a backlight unit may be disposed under the first substrate 110 to supply the light to the display panel 100.

Liquid crystal molecules of the liquid crystal layer LC are driven by an electric field generated between the first pixel electrode PE1 applied with the data voltage and the common electrode CE applied with the common voltage. The transmittance of light is controlled by the liquid crystal molecules driven by the electric field to display the image.

Referring to FIG. 4, each of the first, second, and third pixel electrodes PE1, PE2, and PE3 includes a first trunk portion ST1 having a cross shape and a plurality of first branch portions BC1 protruded and radially extending from the first trunk portion ST1. Each of the first, second, and third pixel electrodes PE1, PE2, and PE3 may be divided into four domains by the first trunk portion ST1.

The first branch portions BC1 may extend in different directions in each domain. The first branch portions BC1 are arranged substantially in parallel to each other and spaced apart from each other in each domain. The first branch portions BC1 adjacent to each other are spaced apart from each other by a distance of micrometers to form a plurality of fine slits.

The liquid crystal molecules of the liquid crystal layer LC in the pixel area PA of each of the first, second, and third pixel electrodes PE1, PE2, and PE3 are pre-tilted in different directions in each domain. Thus, four domains having different liquid crystal alignment directions are formed in the liquid crystal layer LC. A reference viewing angle of the display apparatus 500 may be widened due to the various directions in which the liquid crystal molecules are oriented.

The fourth pixel electrodes PE4 are disposed between the j-th data line and the (j+3)-th data line. For example, the fourth pixel electrodes PE4 may be disposed between the first data line DL1 and the fourth data line DL4.

Each of the fourth pixel electrodes PE4 includes a second trunk portion ST2 extending in the first direction DR1, a third trunk portion ST3 extending in the second direction DR2 to cross the second trunk portion ST2, and a fourth trunk portion ST4 extending in the second direction DR2 to cross the second trunk portion ST2 and spaced apart from the third trunk portion ST3. The fourth trunk portion ST4 may be disposed more adjacent to the fourth transistor TR4 than the third trunk portion ST3. The second, third, and fourth trunk portions ST2, ST3, and ST4 may be integrated with each other.

Each of the fourth pixel electrodes PE4 may include a first area A1 between the third trunk portion ST3 and the fourth trunk portion ST4, a second area A2 between one side of the fourth pixel electrode PE4 adjacent to the fourth transistor TR4 and the fourth trunk portion ST4, and a third area A3 between the other side of the fourth pixel electrode PE4 opposite to the one side of the fourth pixel electrode PE4 and the third trunk portion ST3.

The second trunk portion ST2 includes a first sub-trunk portion ST2_1 extending toward the third trunk portion ST3 at a portion of the second trunk portion ST2 crossing the fourth trunk portion ST4 and a second sub-trunk portion ST2_2 extending in a direction opposite to an extending direction of the first sub-trunk portion ST2_1 at the portion of the second trunk portion ST2 crossing the fourth trunk portion ST4. The first sub-trunk portion ST2_1 extends and crosses the third trunk portion ST3.

Each of the fourth pixel electrodes PE4 includes a plurality of second branch portions BC2 protruded and radially extending from the first sub-trunk portion ST2_1 and the third trunk portion ST3, which form a cross shape, and a plurality of third branch portions BC3 protruded from the second sub-trunk portion ST2_2 and the fourth trunk portion ST4. The second branch portions BC2 extend substantially the same as the first branch portions BC1. The third branch portions BC3 extend in the same direction as the second branch portions BC2 of each of the third areas A3.

The liquid crystal molecules may be pre-tilted in a plurality of the domains of the fourth pixel electrodes PE4. The liquid crystal molecules of the second areas A2 may be pre-tilted in the same direction as the liquid crystal molecules of the third areas A3. An area of each of the first areas A1 may be equal to a sum of an area of each of the second areas A2 and an area of each of the third areas A3 so that an amount of liquid crystal molecules pre-tilted in the first areas A1 is equal to an amount of liquid crystal molecules pre-tilted in the second and third areas A2 and A3.

The (j+1)-th data line may extend to overlap the third trunk portions ST3, and the (j+2)-th data line may extend to overlap the fourth trunk portions ST4. For example, the second data line DL2 may bend and extend to overlap the third trunk portions ST3, and the third data line DL3 may bend and extend to overlap the fourth trunk portions ST4.

When the fourth sub-pixel is disposed under each of the first, second, and third sub-pixels SPX1, SPX2, and SPX3 in each of the pixels PX, each of the pixels PX may include three fourth sub-pixels. In this case, the three fourth sub-pixels include three transistors and three pixel electrodes. As the number of transistors formed of a metal and a semiconductor increases, a light blocking area may increase. Therefore, an aperture ratio and a light transmittance may be reduced, and thus the brightness may be reduced.

However, in the embodiment of the present inventive concept, one fourth sub-pixel SPX4 is disposed under the first, second, and third sub-pixels SPX1, SPX2, and SPX3 of each of the pixels PX. Therefore, the number of transistors is reduced and the aperture ratio and the light transmittance are increased. As a result, the brightness of the pixels PX may be increased. Additionally, because the brightness is increased in proportion to areas of the fourth sub-pixels SPX4 displaying the white color, the brightness of each of the pixels PX may become higher.

Consequently, the display apparatus 500 according to the exemplary embodiment of the present inventive concept may increase the aperture ratio and the light transmittance, and thus the brightness of the display apparatus 500 may be improved.

Figure 6:
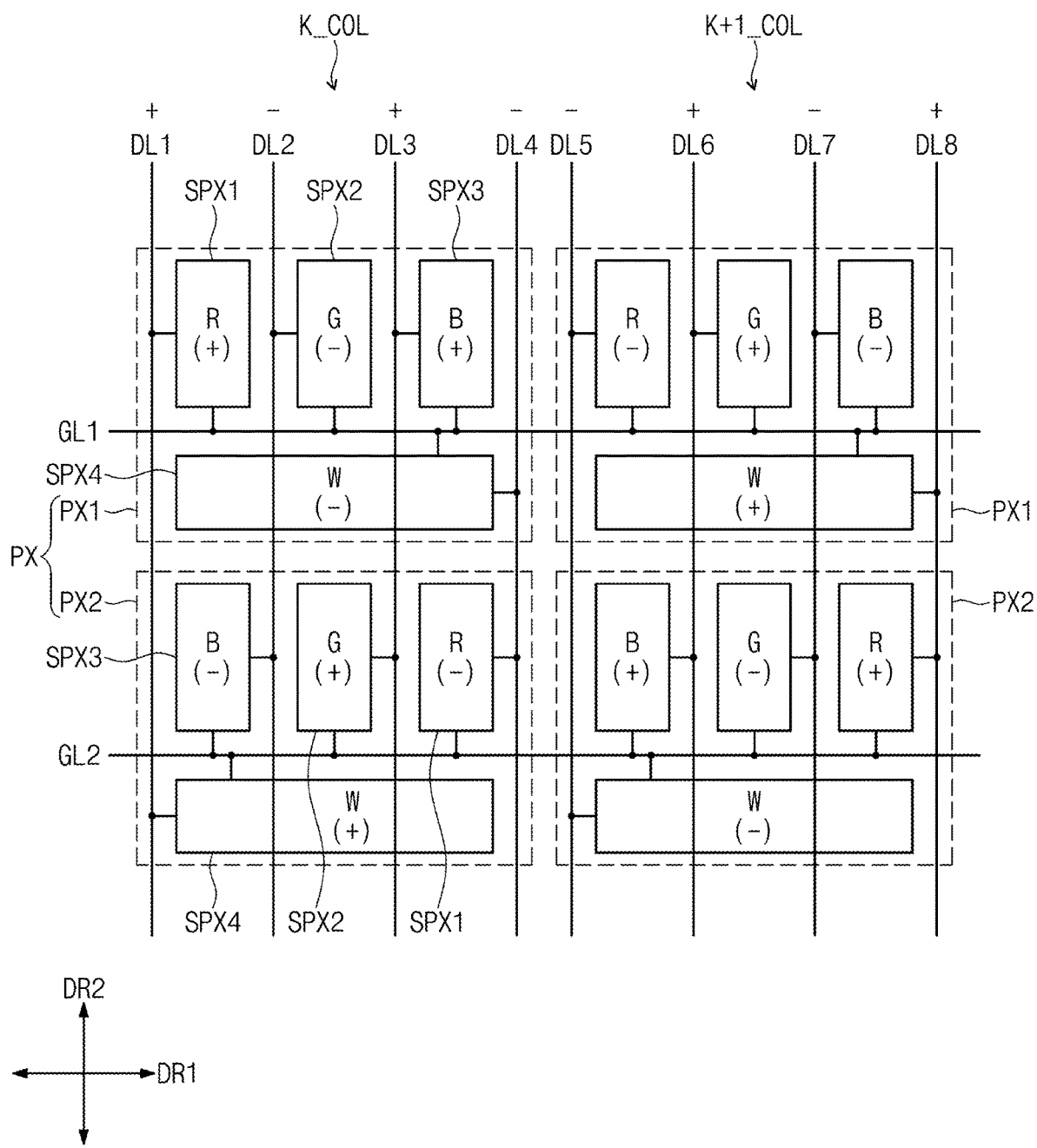
FIG. 6 is a view showing polarities of data voltages applied to the first and second pixels illustrated in FIG. 2.

FIG. 6 is a view showing polarities of data voltages applied to the first and second pixels illustrated in FIG. 2.

Referring to FIG. 6, data voltages having positive (+), negative (−), positive (+), and negative (−) polarities are respectively applied to the j-th, (j+1)-th, (j+2)-th, and (j+3)-th data lines connected to the first and second pixels PX1 and PX2 arranged in a k-th column K_COL. The "k" is a natural number. Polarities of the data voltages applied to the first and second pixels PX1 and PX2 arranged in the k-th column K_COL are opposite to polarities of data voltages applied to the first and second pixels PX1 and PX2 arranged in a (k+1)-th column K+1_COL.

For example, the data voltages having positive (+), negative (−), positive (+), and negative (−) polarities are respectively applied to the first, second, third, and fourth data lines DL1, DL2, DL3, and DL4 connected to the first and second pixels PX1 and PX2 arranged in the k-th column K_COL. The data voltages having negative (−), positive (+), negative (−), and positive (+) polarities are respectively applied to fifth, sixth, seventh, and eighth data lines DL5, DL6, DL7, and DL8 connected to the first and second pixels PX1 and PX2 arranged in the (k+1)-th column K+1_COL. Polarities of the first, second, third, and fourth sub-pixels SPX1, SPX2, SPX3, and SPX4 may be determined according to the polarities of the data voltages.

When pixels with the same color have the same polarities, a ripple may occur with the common voltage Vcom, and as a result, the image may not be normally displayed. However, in the embodiment of the present inventive concept, because the number of positive polarities and the number of negative polarities of the pixels having the same color are the same and are alternatively arranged, the ripple may not occur with the common voltage Vcom.

Figure 7:
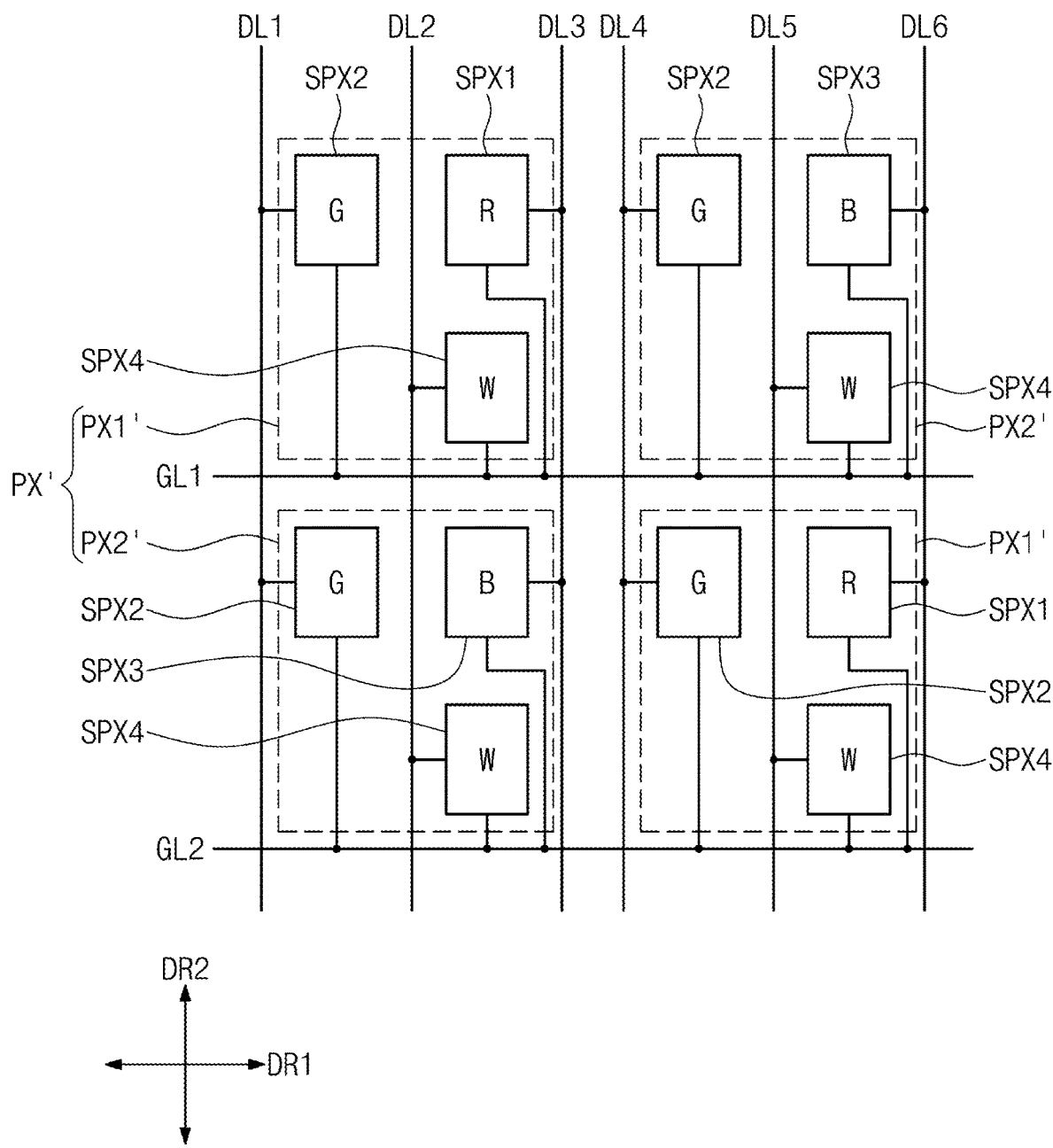
FIG. 7 is a view showing a configuration of pixels of a display apparatus according to another exemplary embodiment of the present disclosure.

FIG. 7 is a view showing a configuration of pixels of a display apparatus according to another exemplary embodiment of the present disclosure.

Referring to FIG. 7, pixels PX' include a plurality of first and second pixels PX1', PX2' each including three sub-pixels of first, second, third, and fourth sub-pixels SPX1, SPX2, SPX3, and SPX4. The first pixels PX1' and the second pixels PX2' are alternatively arranged in the first direction DR1. Additionally, the first pixels PX1' and the second pixels PX2' are alternatively arranged in the second direction DR2.

Each of the first pixels PX1' may include the second and fourth sub-pixels SPX2 and SPX4 and any one of the first and third sub-pixels SPX1 and SPX3. Each of the second pixels PX2' may include the second and fourth sub-pixels SPX2 and SPX4 and the other of the first and third sub-pixels SPX1 and SPX3.

In detail and as shown in FIG. 7, each of the first pixels PX1' includes the first sub-pixel SPX1 and the second and fourth sub-pixels SPX2 and SPX4, and each of the second pixels PX2' includes the third sub-pixel SPX3 and the second and fourth sub-pixels SPX2 and SPX4. The second sub-pixels SPX2 of the first and second pixels PX1' and PX2' arranged in the same column are disposed in a h-th column. The first, third, and fourth sub-pixels SPX1, SPX3, and SPX4 of the first and second pixels PX1' and PX2' arranged in the same column are disposed in a (h+1)-th column. The "h" is a natural number.

The second sub-pixel SPX2, the fourth sub-pixel SPX4, and the first sub-pixel SPX1 of each of the first pixels PX1' of the first and second pixels PX1' and PX2' arranged in the same column may be commonly connected to an i-th gate line and respectively connected to j-th, (j+1)-th, and a (j+2)-th data lines. For example, the second sub-pixel SPX2, the fourth sub-pixel SPX4, and the first sub-pixel SPX1 may be sequentially connected to the j-th, (j+1)-th, and (j+2)-th data lines, respectively.

The second sub-pixel SPX2, the fourth sub-pixel SPX4, and the third sub-pixel SPX3 of each of the second pixels PX2' of the first and second pixels PX1' and PX2' arranged in the same column may be commonly connected to an (i+1)-th gate line and respectively connected to the j-th, (j+1)-th, and (j+2)-th data lines. For example, the second sub-pixel SPX2, the fourth sub-pixel SPX4, and the third sub-pixel SPX3 may be sequentially connected to the j-th, (j+1)-th, and (j+2)-th data lines, respectively.

For example, the second sub-pixel SPX2, the fourth sub-pixel SPX4, and the first sub-pixel SPX1 of the first pixel PX1' arranged in the first column are connected to the first gate line GL1 and are sequentially connected to the first, second, and third data lines DL1, DL2, and DL3, respectively. The second sub-pixel SPX2, the fourth sub-pixel SPX4, and the third sub-pixel SPX3 of the second pixel PX2' arranged in the first column are connected to the second gate line GL2 and are sequentially connected to the first, second, and third data lines DL1, DL2, and DL3, respectively.

The second sub-pixels SPX2 are disposed between the j-th data line and the (j+1)-th data line. For example, in FIG. 7, the second sub-pixels SPX2 are disposed either between the first data line DL1 and the second data line DL2 or between the fourth data line DL4 and the fifth data line DL5.

The first, third, and fourth sub-pixels SPX1, SPX3, and SPX4 are disposed between the (j+1)-th data line and the (j+2)-th data line. For example, in FIG. 7, the first, third, and fourth sub-pixels SPX1, SPX3, and SPX4 are disposed either between the second data line DL2 and the third data line DL3 or between the fifth data line DL5 and the sixth data line DL6.

Figure 8:
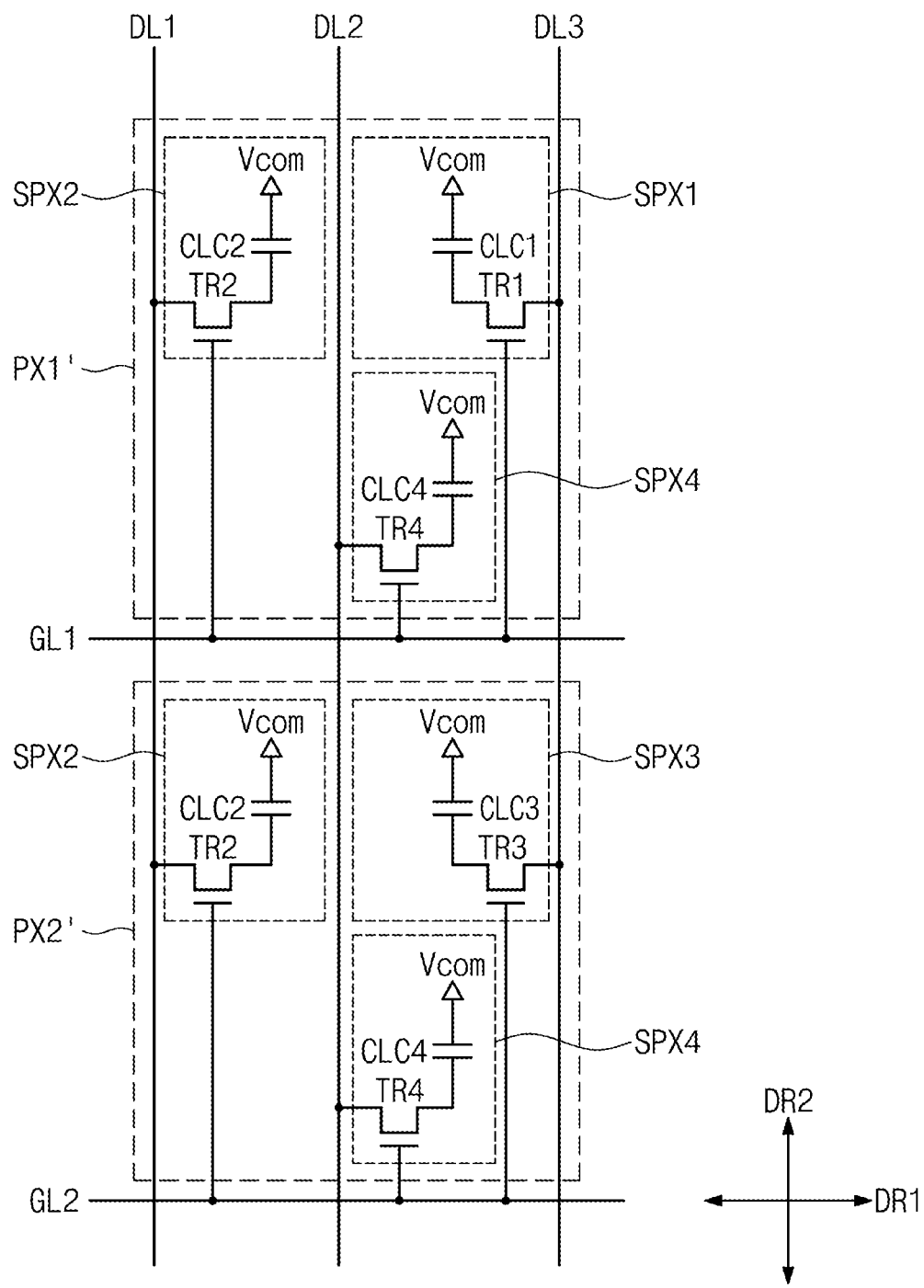
FIG. 8 is an equivalent circuit diagram showing the first and second pixels illustrated in FIG. 7.

FIG. 8 is an equivalent circuit diagram showing the first and second pixels of one pixel of the pixels illustrated in FIG. 7.

Referring to FIG. 8, the first, second, third, and fourth sub-pixels SPX1, SPX3, SPX3, and SPX4 include first, second, third, and fourth transistors TR1, TR2, TR3, and TR4 and first, second, third, and fourth liquid crystal capacitors CLC1, CLC2, CLC3, and CLC4 connected to the first, second, third, and fourth transistors TR1, TR2, TR3, and TR4.

The first, second, third, and fourth sub-pixels SPX1, SPX3, SPX3, and SPX4 are connected to the i-th and (i+1)-th gate lines and the j-th, (j+1)-th, and (j+2)-th data lines. For example, the second transistor TR2 of the first pixel PX1' is connected to the first gate line GL1 and the first data line DL1, the fourth transistor TR4 of the first pixel PX1' is connected to the first gate line GL1 and the second data line DL2, and the first transistor TR1 of the first pixel PX1' is connected to the first gate line GL1 and the third data line DL3.

The second transistor TR2 of the second pixel PX2' is connected to the second gate line GL2 and the first data line DL1, the fourth transistor TR4 of the second pixel PX2' is connected to the second gate line GL2 and the second data line DL2, and the third transistor TR3 of the second pixel PX2' is connected to the second gate line GL2 and the third data line DL3.

Figure 9:
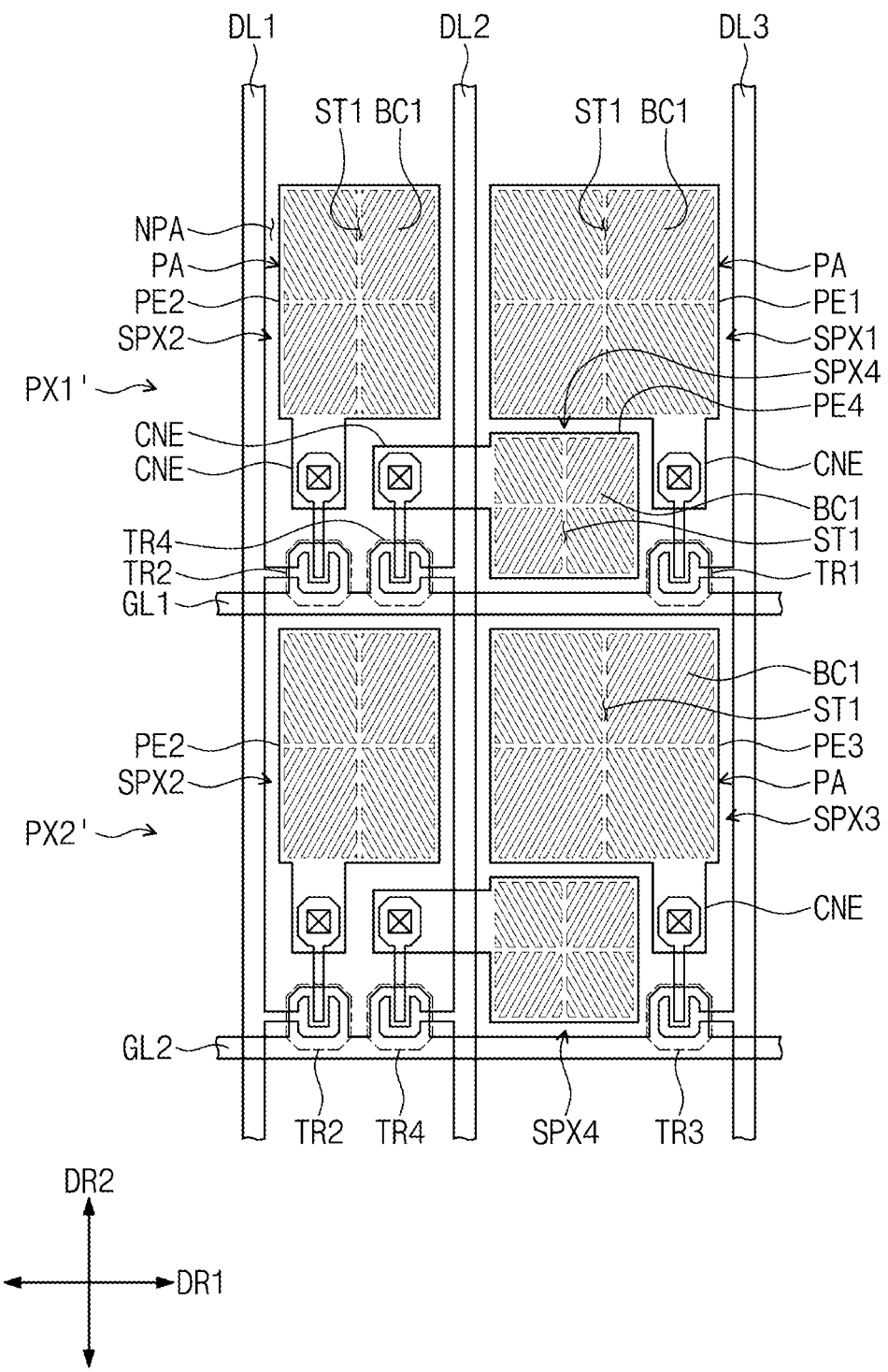
FIG. 9 is a layout diagram showing the first and second pixels illustrated in FIG. 8.

FIG. 9 is a layout diagram showing the first and second pixels illustrated in FIG. 8.

Referring to FIG. 9, the first sub-pixel SPX1 includes the first transistor TR1 and a first pixel electrode PE1 connected to the first transistor TR1. The second sub-pixel SPX2 includes the second transistor TR2 and a second pixel electrode PE2 connected to the second transistor TR2. The third sub-pixel SPX3 includes the third transistor TR3 and a third pixel electrode PE3 connected to the third transistor TR3. The fourth sub-pixel SPX4 includes the fourth transistor TR4 and a fourth pixel electrode PE4 connected to the fourth transistor TR4.

Connections of the transistors TR1, TR2, TR3, and TR4, the gate lines GL1 and GL2, and the data lines DL1, DL2, and DL3 are the same as those of the transistors TR1, TR2, TR3, and TR4, the gate lines GL1 and GL2, and the data lines DL1, DL2, and DL3 illustrated in FIG. 8.

Because structures of the transistors TR1, TR2, TR3, and TR4 illustrated in FIG. 9 are substantially the same as those of the transistors TR1, TR2, TR3, and TR4 illustrated in FIG. 4 and FIG. 5, descriptions of the transistors TR1, TR2, TR3, and TR4 are omitted.

Each of the first, second, third, and fourth pixel electrodes PE1, PE2, PE3, and PE4 includes a first trunk portion ST1 and first branch portions BC1 radially protruded from the first trunk portion ST1 in the same manner as each of the first, second, and third pixel electrodes PE1, PE2, and PE3 illustrated in FIG. 4.

Connections of the first, second, third, and fourth transistors TR1, TR2, TR3, and TR4 and the first, second, third, and fourth pixel electrodes PE1, PE2, PE3, and PE4 are substantially the same as those of the first, second, third, and fourth transistors TR1, TR2, TR3, and TR4 and the first, second, third, and fourth pixel electrodes PE1, PE2, PE3, and PE4 illustrated in FIG. 4.

The second pixel electrodes PE2 and the second and fourth transistors TR2 and TR4 are disposed between the first data line DL1 corresponding to the j-th data line and the second data line DL2 corresponding to the (j+1)-th data line. The first, third, and fourth pixel electrodes PE1, PE3, and PE4 and the first and third transistors TR1 and TR3 are disposed between the second data line DL2 as the (j+1)-th data line and the third data line DL3 as the (j+2)-th data line.

Connection electrodes CNE of the fourth sub-pixels SPX4 extend to a left side of the second data line DL2 via the second data line DL2. The fourth transistors TR4 may be disposed in the left side of the second data line DL2 and connected to the connection electrodes CNE of the fourth sub-pixels SPX4. Connection electrodes CNE of the first and third sub-pixels SPX1 and SPX3 and the first and third transistors TR1 and TR3 are adjacent to the fourth pixel electrodes PE4.

When four sub-pixels are disposed in an area of each of the first and second pixels PX1' and PX2', an additional sub-pixel may be disposed under the second sub-pixel SPX2. However, in the embodiment of the present inventive concept, three sub-pixels are disposed in the area of each of the first and second pixels PX1' and PX2'. Because the additional sub-pixel is not disposed under the second sub-pixel SPX2, the number of transistors used may be reduced. When the number of transistors is reduced, the aperture ratio and the light transmittance are increased, and thus the brightness of the pixels PX may increase.

A brightness of the second sub-pixel SPX2 displaying the green color and a brightness of the fourth sub-pixel SXP4 displaying the white color are higher than a brightness of the first sub-pixel SPX1 displaying the red color and a brightness of the third sub-pixel SPX3 displaying the blue color. Because each of the first and second pixels PX1' and PX2' including the three sub-pixels include the second and fourth sub-pixels SPX2 and SPX4 having relatively high brightness, the brightness of each of the first and second pixels PX1' and PX2' may be relatively higher than the brightness when all four sub-pixels are disposed in the area of each of the first and second pixels PX1' and PX2'.

Consequently, the display apparatus according to the exemplary embodiment of the present inventive concept may improve the brightness by increasing the aperture ratio and the light transmittance.

Figure 10:
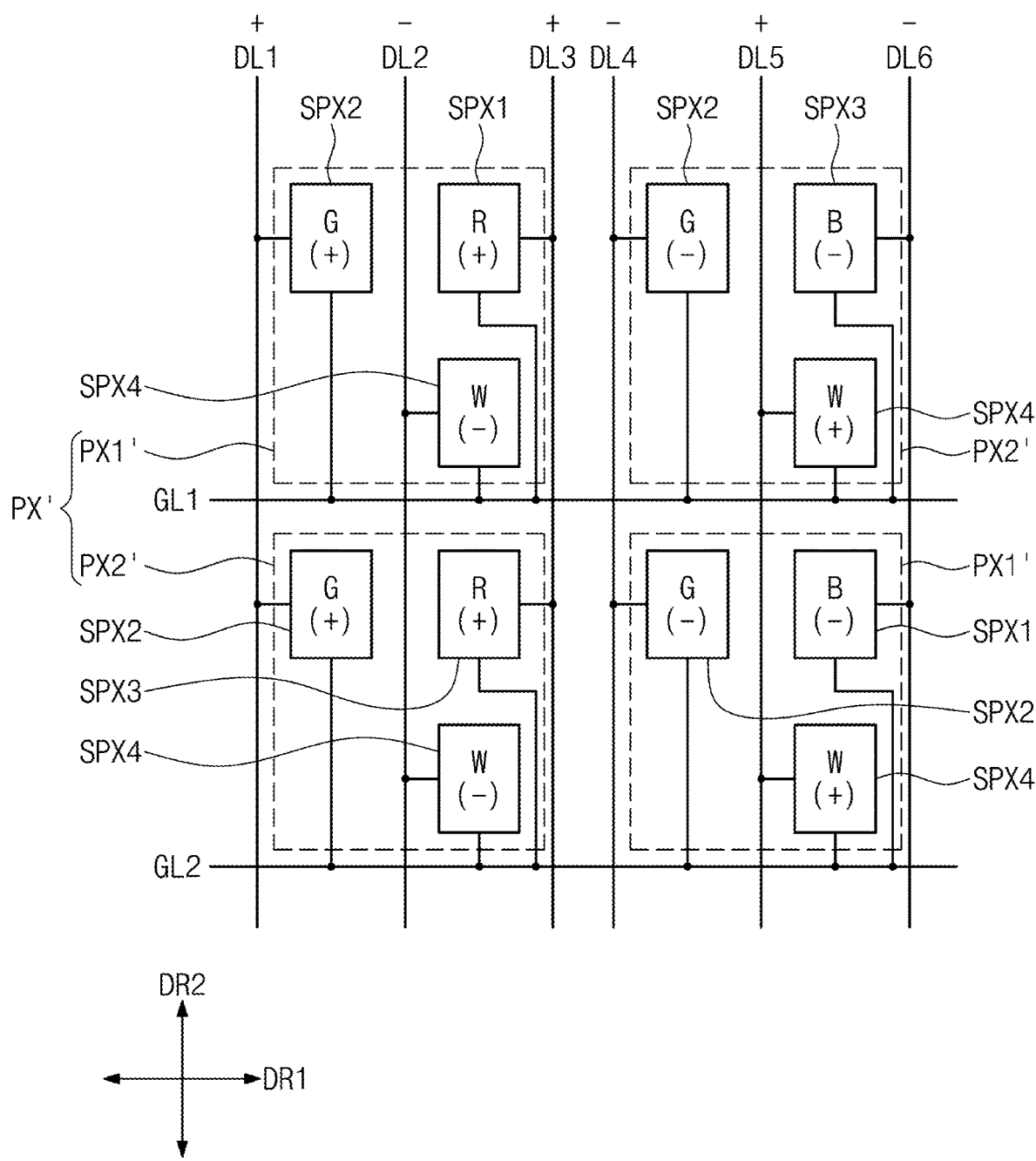
FIG. 10 is a view showing polarities of data voltages applied to the first and second pixels illustrated in FIG. 7.

FIG. 10 is a view showing polarities of data voltages applied to the first and second pixels illustrated in FIG. 7.

Referring to FIG. 10, the polarities of the data voltages applied to the data lines DL1 to DL6 are inverted every one data line. For example, the data voltages having the positive polarities are applied to the first, third, and fifth data lines DL1, DL3 and DL5, and the data voltages having the negative polarities are applied to the second, fourth, and sixth data lines DL2, DL4 and DL6. Polarities of the first, second, third, and fourth sub-pixels SPX1, SPX2, SPX3, and SPX4 may be determined according to the polarities of the data voltages. In the embodiment of the present inventive concept, because the number of positive polarities and the number of negative polarities of the pixels having the same color are the same and alternatively arranged, the ripple may not occur in the common voltage Vcom.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display apparatus comprising:
   a plurality of gate lines extending in a first direction in a plan view of the display apparatus;
   a plurality of data lines extending in a second direction in the plan view, the second direction crossing the first direction; and
   a plurality of pixels connected to the gate lines and the data lines, each of the pixels comprising:
      first, second, and third sub-pixels disposed in an i-th row; and
      a fourth sub-pixel disposed in an (i+1)-th row and spaced apart from the first, second, and third sub-pixels in the second direction in the plan view,
   wherein:
   the first, second, and third sub-pixels and the fourth sub-pixel are arranged with an i-th gate line between the fourth sub-pixel and the first, second, and third sub-pixels and are connected to the i-th gate line;
   the first, second, third, and fourth sub-pixels are connected to different data lines;
   the fourth sub-pixel is not disposed between the first, second, and third sub-pixels in the plan view;
   the "i" is a natural number;
   at least one data line of the data lines connected to the first, second, and third sub-pixels extends through the fourth sub-pixel;
   the fourth sub-pixel comprises:
      a cross-shaped trunk portion extending in the first direction and the second direction, and
      branch portions protruded from the cross-shaped trunk portion; and
   the at least one data line is bent and extends in the fourth sub-pixel, and overlaps a trunk portion extending in the second direction of the cross-shaped trunk portion.

2. The display apparatus of claim 1, wherein the pixels comprise:
   a plurality of first pixels arranged with each other in the first direction; and
   a plurality of second pixels arranged with each other in the first direction and alternately arranged with the first pixels in the second direction.

3. The display apparatus of claim 2, wherein the first sub-pixel of each of the first pixels is connected to a j-th data line, the second sub-pixel of each of the first pixels is connected to a (j+1)-th data line, the third sub-pixel of each of the first pixels is connected to a (j+2)-th data line, the fourth sub-pixel of each of the first pixels is connected to a (j+3)-th data line, and the "j" is a natural number.

4. The display apparatus of claim 3, wherein the first sub-pixel of each of the second pixels is connected to the (j+3)-th data line, the second sub-pixel of each of the second pixels is connected to the (j+2)-th data line, the third sub-pixel of each of the second pixels is connected to the (j+1)-th data line, and the fourth sub-pixel of each of the second pixels is connected to the j-th data line.

5. The display apparatus of claim 4, wherein the fourth sub-pixels of the first and second pixels are arranged between the j-th data line and the (j+3)-th data line, and the (j+1)-th data line and the (j+2)-th data line extend through the fourth sub-pixels.

6. The display apparatus of claim 4, wherein data voltages applied to first and second pixels arranged in a k-th column of the first and second pixels have polarities opposite to polarities of data voltages applied to first and second pixels arranged in a (k+1)-th column of the first and second pixels, the "k" is a natural number, and the data voltages respectively having positive, negative, positive, and negative polarities are applied to the j-th, (j+1)-th, (j+2)-th, and (j+3)-th data lines connected to the first and second pixels arranged in the k-th column, respectively.

7. The display apparatus of claim 4, wherein the first, second, and third sub-pixels of the first and second pixels comprise:
- first, second, and third transistors connected to corresponding gate lines of the gate lines and corresponding data lines of the data lines; and
- first, second, and third pixel electrodes connected to the first, second, and third transistors, respectively, and each of the first, second, and third pixel electrodes comprises:
- a first trunk portion having a cross shape; and
- a plurality of first branch portions protruded and radially extending from the first trunk portion.

8. The display apparatus of claim 4, wherein each of the fourth sub-pixels of the first and second pixels comprises:
- a fourth transistor connected to a corresponding gate line of the gate lines and a corresponding data line of the data lines; and
- a fourth pixel electrode connected to the fourth transistor, the fourth pixel electrode comprises:
- a second trunk portion extending in the first direction;
- a third trunk portion extending in the second direction to cross the second trunk portion;
- a fourth trunk portion extending in the second direction to cross the second trunk portion and spaced apart from the third trunk portion; and
- a plurality of second and third branch portions protruded from the second, third, and fourth trunk portions, and the fourth trunk portion is arranged more adjacent to the fourth transistor than the third trunk portion,
- wherein the cross-shaped trunk portion is formed of the second, third, and fourth trunk portions and the branch portions are formed of the second and third branch portions.

9. The display apparatus of claim 8, wherein the fourth pixel electrode further comprises:
- a first area between the third trunk portion and the fourth trunk portion;
- a second area between one side of the fourth pixel electrode adjacent to the fourth transistor and the fourth trunk portion; and
- a third area between the other side of the fourth pixel electrode opposite to the one side of the fourth pixel electrode and the third trunk portion, the second trunk portion comprises:
- a first sub-trunk portion extending toward the third trunk portion at a portion of the second trunk portion crossing the fourth trunk portion, the first sub-trunk portion crossing the third trunk portion; and
- a second sub-trunk portion extending in a direction opposite to an extending direction of the first sub-trunk portion at the portion of the second trunk portion crossing the fourth trunk portion, the second branch portions are protruded and radially extending from the first sub-trunk portion and the third trunk portion, which cross each other, and the third branch portions extend in the same direction as a second branch portion of the second branch portions in the third area.

10. The display apparatus of claim 9, wherein an area of the first area is equal to a sum of an area of the second area and an area of the third area.

11. The display apparatus of claim 9, wherein the (j+1)-th data line and the (j+2)-th data line extend to overlap the third trunk portion and the fourth trunk portion, respectively.

12. The display apparatus of claim 1, wherein the fourth sub-pixel is larger than each of the first, second, and third sub-pixels.

13. The display apparatus of claim 1, wherein the first sub-pixel is a red pixel, the second sub-pixel is a green pixel, the third sub-pixel is a blue pixel, and the fourth sub-pixel is a white pixel.

14. The display apparatus of claim 1, wherein each of the first, second, and third sub-pixels has a length that extends in the second direction, and the fourth sub-pixel has a length that extends in the first direction and is arranged under the first, second, and third sub-pixels.

* * * * *